United States Patent
Doshi et al.

(10) Patent No.: US 7,761,676 B2
(45) Date of Patent: Jul. 20, 2010

(54) PROTECTING MEMORY BY CONTAINING POINTER ACCESSES

(75) Inventors: Kshitij A. Doshi, Chandler, AZ (US); Quinn A. Jacobson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 11/637,661

(22) Filed: Dec. 12, 2006

(65) Prior Publication Data

US 2008/0140968 A1 Jun. 12, 2008

(51) Int. Cl.
*G06F 12/00* (2006.01)

(52) U.S. Cl. .............. 711/163; 711/152; 711/201; 711/206; 711/207

(58) Field of Classification Search .............. None
See application file for complete search history.

(56) References Cited

U.S. PATENT DOCUMENTS 6,324,628 B1 * 11/2001 Chan .................. 711/163
6,578,122 B2 * 6/2003 Beukema et al. ........... 711/163
2002/0087553 A1 * 7/2002 Kitahara et al. ............ 707/10

OTHER PUBLICATIONS

U.S. Appl. No. 11/349,661, filed Feb. 7, 2006, entitled "Technique for Using Memory Attributes," by Quinn A. Jacobson, et al.
Microsoft Corporation, "How PAE-X86 Works," Mar. 28, 2003, pp. 1-6.
U.S. Appl. No. 11/490,824, filed Jul. 21, 2006, entitled "Dynamically Sharing a Stack Between Different Code Segments," by Subhash Gutti, et al.

* cited by examiner

*Primary Examiner*—Christian P Chace
*Assistant Examiner*—Alan Otto
(74) *Attorney, Agent, or Firm*—Trop, Pruner & Hu, P.C.

(57) ABSTRACT

In one embodiment, the present invention includes a method for associating a first identifier with a first pointer that points to a first object in a memory. The first identifier may correspond to a value in a segment of a map array for a location of the first object in the memory. Other embodiments are described and claimed.

24 Claims, 8 Drawing Sheets

PROTECTING MEMORY BY CONTAINING POINTER ACCESSES

BACKGROUND

Programmers working in type-unsafe languages such as the C or C++ languages can unknowingly introduce pointer value bugs which may arise, for example, when a pointer value changes erroneously to point to an area of memory to which access was not intended. Sometimes, the programmer may not be in error at all and yet leave the door open to memory referencing errors that may crop up later when a program is linked with a separately developed software component. To catch these errors, the software industry encounters a difficult cost treadmill: as applications become richer in functionality and in diversity of the components that evolve separately, the time and effort to test them for pointer corruption errors continues to increase.

In less benign situations, pointer errors can cause software to fail in the field, and random data corruption can lead to serious consequences in damages and recovery costs. An even more pernicious problem arises from actual or latent errors in untyped, and therefore unchecked memory accesses. Malicious code can exploit such vulnerabilities such as by hijacking control by overwriting return addresses on program stacks. In the information-based modern age, such attacks may create serious threats to life and commerce, and are usually rebuffed with expensive redundancies and temporary countermeasures, often with limited success.

DETAILED DESCRIPTION

Figure 1:
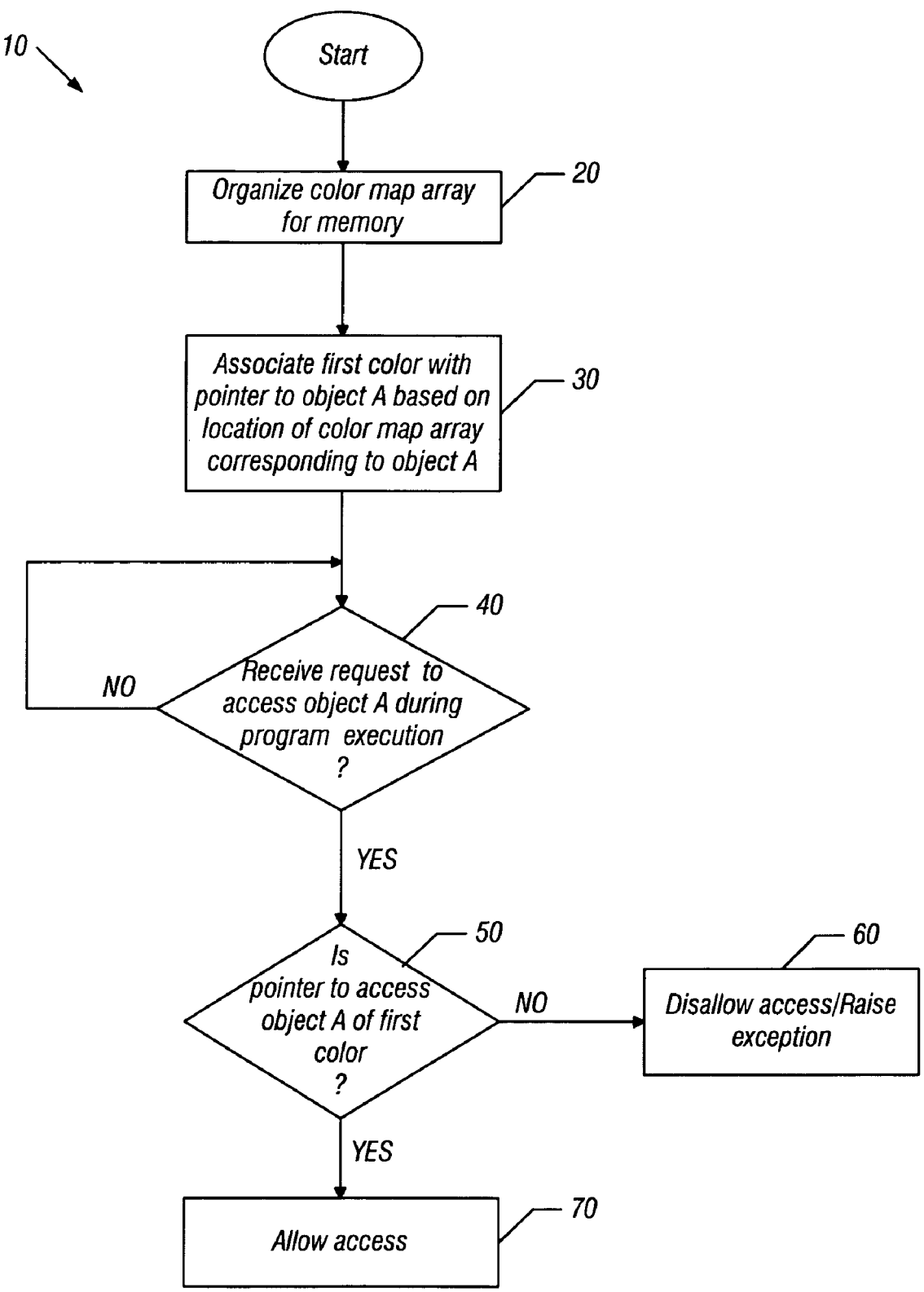
FIG. 1 is a flow diagram of a method in accordance with one embodiment of the present invention.

Embodiments of the present invention may be used to provide statistical protection against improper memory accesses such as type-unsafe pointer accesses. Such protection may be provided in a lightweight manner, as pointers to dynamically allocated memory ranges can be confined efficiently within those ranges through encoding that uses a small amount of space, e.g., only a few bits per pointer. In some embodiments, this encoding may be referred to as the coloring of pointers. For statically allocated memory ranges, similar encoding can be employed efficiently with compiler-differentiated pointer arithmetic. In this way, a pointer whose color is, e.g., "red" is only valid when it addresses a memory region whose color is also "red". That is, the color of a pointer may effectively serve to limit a pointer from straying outside of its upper and lower bounds. Such encodings that associate a color with a pointer may be very lightweight and direct, and do not require reachability analysis and complex metastate.

In some implementations, the encoding (e.g., coloring) can be done at multiple levels for encoding efficiency, which affords efficiency in cache and memory overhead of fine-grained coloring. As an example, the color of a pointer may be represented by a small number of virtual address (VA) bits of the pointer, and therefore a pointer effectively bears its color. In turn, the pointer size remains the same whether or not it is used to verify access validity. In this way, complete transparency exists as pointers migrate between legacy (i.e., non-checking) and color-aware binaries. Note that because in many embodiments, the colors may be limited in number and therefore recycled, not all pointer errors can be caught. However, good randomization in the assignment of colors can make it very unlikely that pointer corruptions escape detection for too long. In some embodiments, coloring granularities can be changed as will be described below.

Note that embodiments may implement a statistical approach to provide optional and lightweight monitoring of accesses to large portions of memory where pointer errors may arise most commonly. While this approach may be primarily preventive in nature as it allows programmers to discover and remove pointer vulnerabilities in their code, embodiments can be used also to provide dynamic runtime protection that reduces dramatically the impact of a network-based attack.

Thus embodiments may be implemented in production deployments of software to allow continuous enforcement of safety checks. Because colored pointers can look like non-colored pointers to legacy software, such software can continue to operate as intended, and thus legacy software can call memory allocators that are color aware. Furthermore, these colored pointers may result in pointer confinement when used from non-legacy modules. Thus, by removing the discontinuity between legacy software and code in accordance with an embodiment of the present invention, the likelihood that latent pointer errors are discovered before they lead to intended or unintended damage is kept very high.

Embodiments thus may provide fine-grained access protection to data objects in a program's memory, by associating ranges of memory with a range of memory colors and encoding the colors in a way that does not create pointers which either are fat, or are ordinary sized pointers associatively coupled with out-of-line descriptor state. That is, a pointer's size remains the same regardless of whether it is colored or not. In some embodiments, pointers may be 64 bits, although not all of these bits of its VA are used in every program region. In one embodiment, an encoding may use six bits of the virtual address in a way that both accommodates unconstrained or legacy pointers that can vary in 63 bits of their value, and provides for colored pointers that can vary in, e.g., 58 bits of the value. In some embodiments, only the virtual ranges of arenas used for particular program usage such as dynamic memory allocation, program stacks, and static read/write data may be constrained in this way. In other embodiments, a reasonably high degree of checking may be realized by using between 5 and 8 bits for color encoding. To a legacy program, a colored pointer is no different than a normal pointer, and so long as the legacy program itself does not corrupt a colored pointer with an invalid value, new modules or functions can enforce access controls based on the color encoding.

In addition to the transparent treatment of pointers so that color pointers are passed back and forth between color-aware software and legacy software that is not color aware, embodiments can enforce color checking in legacy mode operation in order to find pointer bugs in legacy code.

In many implementations, the hardware used to support colored pointers may be a small amount of additional state parallel to that of a translation lookaside buffer (TLB), however, such structure may be much smaller in the number of bits than needed by TLBs, and not be in the performance critical path. Because it is not in a performance critical path, such structures are free, for example, to perform piecewise associative lookups for determining the color of memory at a given address instead of the fast but hardware and power-expensive lookups that TLBs are designed to perform.

Referring now to FIG. 1, shown is a flow diagram of a method in accordance with one embodiment of the present invention. As shown in FIG. 1, method 10 may be used to organize a colormap array (also referred to herein as a "colormap") and use the information in such an array to determine bounds for pointers into memory. As shown in FIG. 1, method 10 may begin by organizing a colormap array for a memory (block 20). For example, a memory heap may include a number of memory regions, e.g., page-sized regions, each of which is formed of a number of blocks, e.g., 512 byte blocks in each 4K memory page. In one embodiment, the colormap array may include a byte for each 512 byte block of memory. Thus the colormap array may be organized as a number of bytes, each corresponding to a different block of memory, in this embodiment. The values for each byte may be a random color, e.g., an 8-bit value that corresponds to one of 256 different colors. However, the scope of the present invention is not limited in this regard and in various embodiments, different granularities of coloring may be realized. For example, in other embodiments 5-bit values may be provided to enable selection of one of 32 different colors, 4-bit values for 16 colors and so forth.

As described, these colors may be arbitrarily associated with the corresponding memory, and thus colors may be reused according to a random scheme. While such arbitrary assignment may cause some pointer escapes to go undetected, statistically high protection can be provided with minimal cost (e.g., a small number of bits). Note that it is the choice of colors that is flexible; a color can be chosen from among different possible colors, one that is arbitrarily selected in order to create the likelihood that neighboring blocks differ in color, so long as they are not holding elements of the same large object or array.

In one embodiment, when associating colors with memory through the use of a colormap, an arbitrary systematic color allocation algorithm may be used. Such an algorithm may assign colors to objects according to a set of rules that maximizes the probability of pointer errors manifesting in color mismatches. For example, such rules would include that adjacent objects should have different colors whenever possible to maximize the probability of detecting bounds violations. Another example is that when re-assigning a color to a block of memory, a color that has not been recently used with that block is preferable to increase the probability of detecting a stale pointer reference.

Referring still to FIG. 1, control passes from block 20 to block 30. There a first color may be associated with a pointer that points to a given object to be stored in the heap (block 30). More specifically, this first color may be obtained by accessing the location of the colormap that corresponds to the block of memory in which the object is to be stored. Assume for ease of illustration that an object A is to be stored in a first block of a heap represented by the colormap. Accordingly, the color (i.e., value) stored in the first location (e.g., byte) of the colormap may be associated with the pointer to the object. In various embodiments, such association may be realized by storing the color identifier as part of a virtual address of the pointer. For example, in embodiments in which a 64-bit pointer is used, some number of the high order bits of the VA may be used to store the color identifier. For example, in one embodiment bits 58 to 62 may be used to store a 5-bit identifier obtained from the colormap, along with an enable bit. In this way, the pointer's color is associated with the color of the range of locations in memory that it is to access, allowing future access to the desired object during program operation that implements color checking in accordance with an embodiment of the present invention, while still allowing ordinary access in a legacy or non-enabled color mode. While shown in FIG. 1 as associating only a single pointer with an object and a corresponding color, it is to be understood that method 10, and more specifically block 30 may be performed for as many pointers as may be present in a given program, program segment or other code region, which may include both instruction code and data. Furthermore, it is to be understood that the association of colors with pointers may be performed dynamically during program operation, e.g., during run time by a compiler, linker, memory allocator or other control structure.

Referring still to FIG. 1, after one or more pointers have been associated with a color in accordance with an embodiment of the present invention, during program execution access to an object in heap memory may be controlled based on the identifiers associated with a pointer to the object. Thus as shown in FIG. 1, it may be determined whether a request has been received to access an object during program execution (diamond 40). For example, an access validator or other such hardware may receive an access request which may include, e.g., a pointer. If access control in accordance with an embodiment of the present invention is enabled, e.g., via a control bit within a pointer, control may pass to diamond 50 to determine if the pointer that is seeking to access object A is of the first color. Thus, the access validator may determine whether the color stored in the pointer matches the corresponding color in the colormap array that is associated with the location in memory in which object A is stored.

If these colors do not match, control passes to block 60, where the access may be disallowed. Furthermore, in some implementations an exception may be raised which may cause, for example, a user-level handler to perform an exception handling routine. If instead, the pointer color matches the color in the colormap, control passes to block 70 where the access may be allowed. While shown with this particular implementation in the embodiment of FIG. 1, the scope of the present invention is not limited in this regard and in other embodiments, different manners of organizing a colormap and associating pointers or other accessors with a given color may be realized. Furthermore, in other embodiments different hardware, software and/or firmware may be used to perform access validation in accordance with an embodiment of the present invention.

Figure 2:
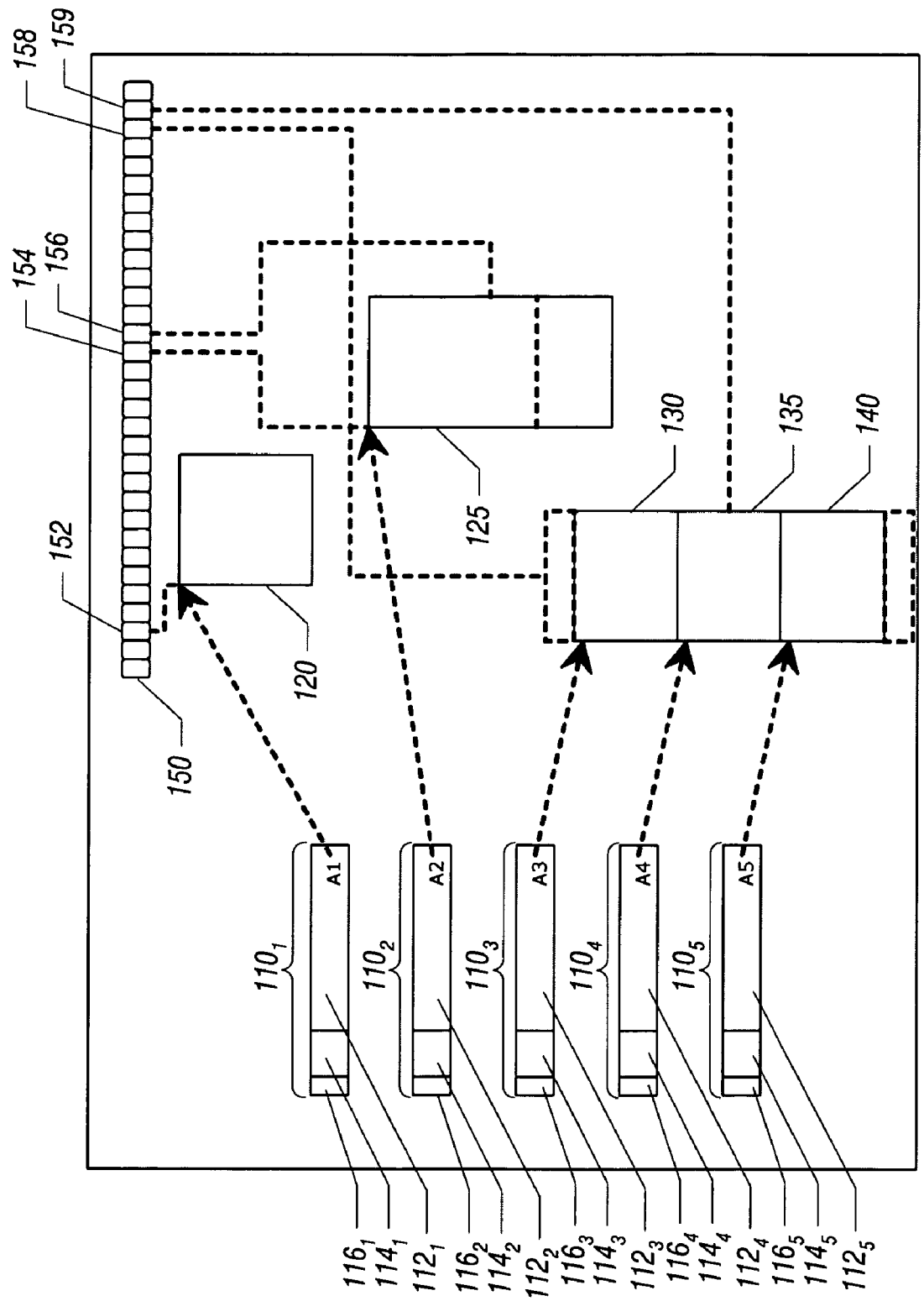
FIG. 2 is a block diagram of an implementation of pointer coloring in accordance with an embodiment of the present invention.

Pointer coloring at a relatively coarse grain such as described with respect to the method of FIG. 1 may be applied to dynamically allocated memory (e.g., through an allocator such as using memory allocation operation such as a malloc function of a library) to paint the memory in a coarse-grained manner. Referring now to FIG. 2, shown is a block diagram of an implementation of pointer coloring in accordance with an embodiment of the present invention. As shown in FIG. 2, five pointers, A1-A5 point respectively to 5 objects of sizes 512, 712, 320, 320, and 320 bytes, respectively, objects 120, 125, 130, 135, and 140. As shown in FIG. 2, each pointer A1-A5, also referred to in FIG. 2 as pointers $110_1$-$110_5$ (generically pointer 110), includes a virtual address (VA) portion $112_1$-$112_5$ (generically virtual address portion 112), a color encoding portion $114_1$-$114_5$ (generically color encoding portion 114), and a color enable indicator $116_1$-$116_5$ (generically color enable indicator 116). In various embodiments, VA portion 112 may be used to obtain the address of the corresponding object pointed to by pointer 110. Color encoding portion 114 may identify the color of the corresponding object. To be a valid pointer reference, color encoding portion 114 of, for example, pointer A1 should have the same identification or color as that associated with object 120. Specifically, as shown in FIG. 2, to be a valid pointer reference, color encoding portion $114_1$ of pointer $110_1$ should be colored with the color present in a location 152 of a colormap array 150, which provides the color for object 120. Color enable indicator $116_1$ of pointer $110_1$ may be used to identify whether the pointer is to be checked for proper color access in accordance with an embodiment of the present invention or operate in a legacy mode without such color checking.

An array 150, referred to herein as a colormap array, may be used to define the colors of a memory. For example, the coloring of a memory heap may be represented in program virtual space by a contiguous byte array that forms colormap array 150 (also referred to as array 150) as shown in FIG. 2. In array 150, 1 byte per 512 byte block of memory (i.e., an 8 byte memory commitment per 4K page) may be used to encode the colors in memory. Using such exemplary encoding, a space overhead of 0.2 percent is consumed, which may be used to statistically catch stray pointers at 512 byte boundaries 31 out of 32 times, or 97% under random coloring. Note that colormap array 150 can be swapped and paged just like any other program structure; although for efficiency, it may be treated as a page table data structure. In some implementations, a register present, e.g., in a processor control structure, may be used to store the base address of the colormap array. In this way, the processor may perform its own color lookup and caching, such that software assistance may be used infrequently.

As shown in FIG. 2, colormap array 150 may thus include a number of storage locations which in the embodiment of FIG. 2 each may be a byte wide, with each location corresponding to a given block, e.g., a 512-byte memory block. For purposes of discussion herein, colormap array 150 includes locations 152, 154, 156, 158, and 159, each of which corresponds to a given block of memory. Note that at least locations 154 and 156 may be colored with the same color. That is, locations 154 and 156 may both store the same value. In this way, as described further below, an object having a size larger than a single memory block may be contiguously stored using a single color identifier.

While described in the particular implementation of FIG. 2 as including single byte locations each corresponding to a 512-byte block memory, the scope of the present invention is not limited in this regard. In other embodiments, various granularities of memory painting may be realized using a virtually contiguous but physically sparse colormap array. For example, a colormap array may vary and scale with a dynamic footprint of a given program. For example, in other implementations different scaling may be realized. Encodings from, e.g., 4 bits to 8 bits per memory block could be realized, enabling from 16 to 256 different colors. Furthermore, each such individual location in the colormap array can correspond to different size memory blocks, e.g., from 256 bytes to 1024 bytes. Further as discussed below, various mechanisms to enable finer-grained control may be realized. In some implementations, a block size-to-color range granularity tradeoff may be performed, either statically or dynamically.

For the embodiment of FIG. 2, color mapping may be performed as follows. Assume that pointers A1, A2, and A3 each have three different colors and that the colors in pointers A1, A2, and A3 each match a color encoded against the corresponding memory areas to which these pointers point. Also assume that pointers A3, A4, and A5 all share the same color, and thus the entire 960 byte range of the three consecutive objects they point into has that shared color. As shown in FIG. 2 the heap region from where memory for the objects allocated may be tiled with blocks, each block having some color, and each block having a size of, e.g., 512 bytes. In this example, object 125 pointed to by pointer A2 may be allocated in a 1024 byte range, with 712 of those bytes used for the object. Similarly, pointers A3, A4, and A5 may be placed contiguously as in FIG. 2, and the two 512 byte blocks that furnish the needed area are assigned the same color as encoded in pointers A3, A4, and A5. Note that pointers A3, A4, and A5 point into consecutive objects of an array in this example, and therefore each of these pointers may change to point into the memory locations of the other two with ordinary pointer arithmetic without it being an incorrect reference in, e.g., a C or C++ program. In some implementations, a coloring aware allocation library may allocate multiple pages to serve as an arena from where objects of intermediate sizes (such as the 712 byte object) are allocated contiguously to minimize fragmentation. Further, flexible (and randomized) tradeoffs between the degree of checking desired and the efficiency of space consumption may be implemented.

This type of coloring may be used for pointers in 64-bit virtual spaces. Assume for purposes of this embodiment that 6 bits (e.g., bits 62-57) of a 64-bit virtual address can be used to encode coloring as follows: if bit 62 is 0, the pointer is not a colored pointer, and should be treated like an ordinary pointer; if bit 62 is 1, the pointer is treated as a colored pointer, and bits 61-57 encode one of 32 colors. The remaining bits in the pointer may correspond to a pointer value, i.e., a virtual address that is being accessed. This bit assignment is exemplary only, and in various implementations many different encodings may be used to enable pointer coloring in accordance with one embodiment.

For a colored pointer, the color of the memory area it accesses with the remaining addressing bits should match the pointer color. In some embodiments one or more specialized colors may be used to provide global control. For example, a so-called wild color, such as a white memory area can be accessed by pointers of any color, while another wild color, e.g., a black memory area cannot be accessed by any pointer color (including black). In some embodiments, memory areas may be painted in units of 512 bytes each, with control of coloring retained by a user-level memory manager (such as a memory allocator (malloc) library function) and user-level coloring library that wraps system calls such as a memory map call (e.g., mmap). Consecutive 512 byte blocks of memory can be painted with the same color as needed. Note that colors of pointers and colormaps can be reassigned by user-level managers; and the user-level color managers may receive color access violations as exceptions so that they can provide additional specialization in the form of debugging, color-overlapping, program terminations, and so forth.

Figure 3:
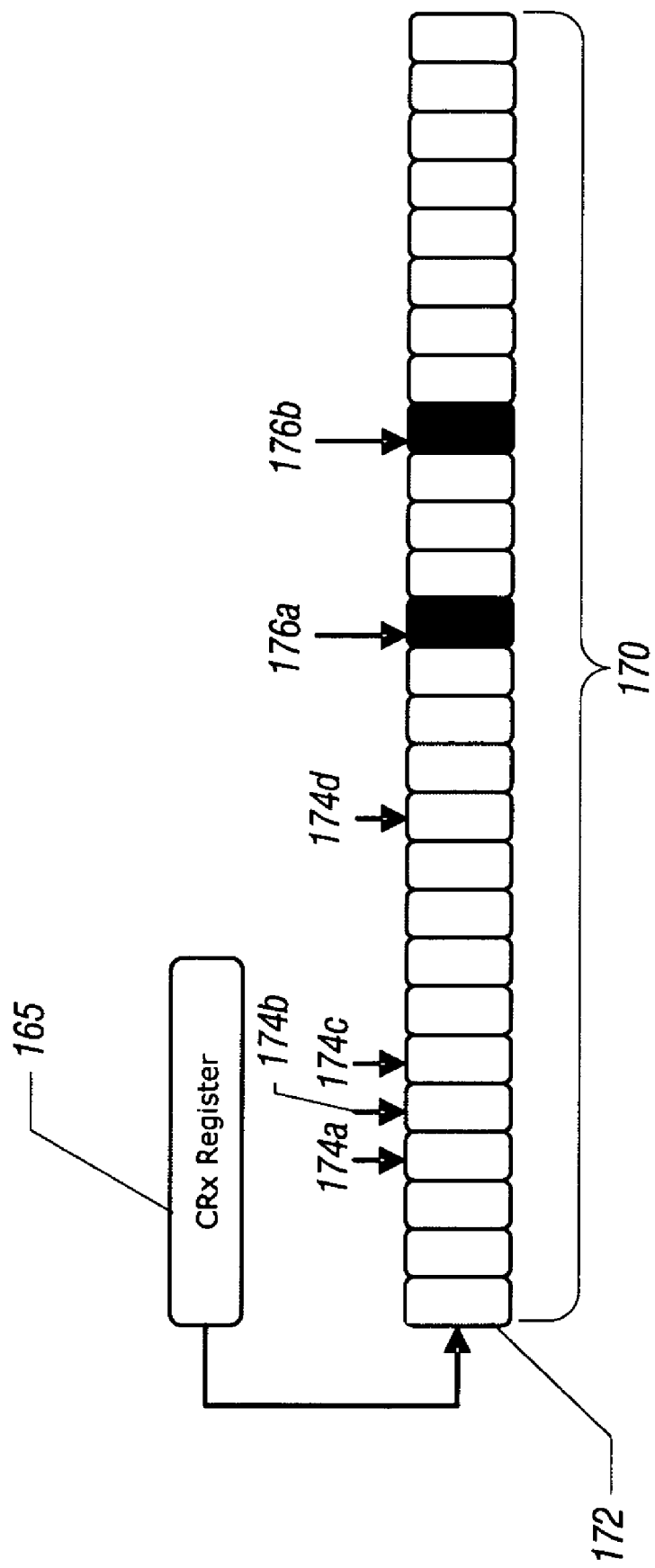
FIG. 3 is a block diagram of a colormap array in accordance with another embodiment of the present invention.

Referring now to FIG. 3, shown is a block diagram of a colormap array in accordance with another embodiment of the present invention, along with a control register. As shown in FIG. 3, a control register 165, which may be a so-called color register may be present, e.g., in a register file of a processor such as a register file that is to store various control registers. Control register 165 may be used to store a base address of a colormap array in virtual space. Thus, to access the colormap, a processor may obtain the value stored in color register 165 to thus access the beginning of a given colormap array. Thus as shown in FIG. 3, color register 165 may be used to access a colormap array 170. As shown in FIG. 3, colormap array 170 may include a plurality of locations, each corresponding to a given block of memory. In the implementation shown in FIG. 3, particular identified locations include a first location 172, which may correspond to the base address stored in control register 165. Furthermore, multiple locations $174_a$, $174_b$, $174_c$ and $174_d$ may each store a predetermined value, e.g., corresponding to a white color. Such a predetermined value may correspond to a wild color that can be accessed by a pointer of any given color. In contrast, other locations, e.g., locations $176_a$ and $176_b$ may be mapped with a different predetermined color value, e.g., black, which may correspond to a wild color that prevents any access to these regions. As will be described further below, such regions may be used as guard bands to prevent overflows or other improper accesses to certain memory regions.

In some embodiments a buffer may be used to store frequently accessed color mapping tuples, just as translation lookaside buffers (TLBs) in modern processors store frequently accessed tuples that map logical addresses to physical addresses. Such a buffer may be referred to as a color lookaside buffer (CLB), and may be used to translate the logical address that a pointer may point to, to the associated color recorded in the colormap for that logical address. The CLB need not be maintained coherently with a TLB, since coloring exceptions can be handled in software. The CLB can also be slower to respond to a lookup than a TLB, since color comparison can proceed in parallel with data access and does not hold up the data access itself. In some embodiments, the CLB can implement a hardware or software walker to fill the appropriate colormap on a miss in the CLB.

When there is a mismatch between the color of a pointer and the color of an address being referenced, a user-level handler may be invoked. For example, a user-level runtime layer may handle all color violations and determine appropriate application-specific responses to color violations In some embodiments, a lightweight yield mechanism may be used to implement such a handler.

Figure 4:
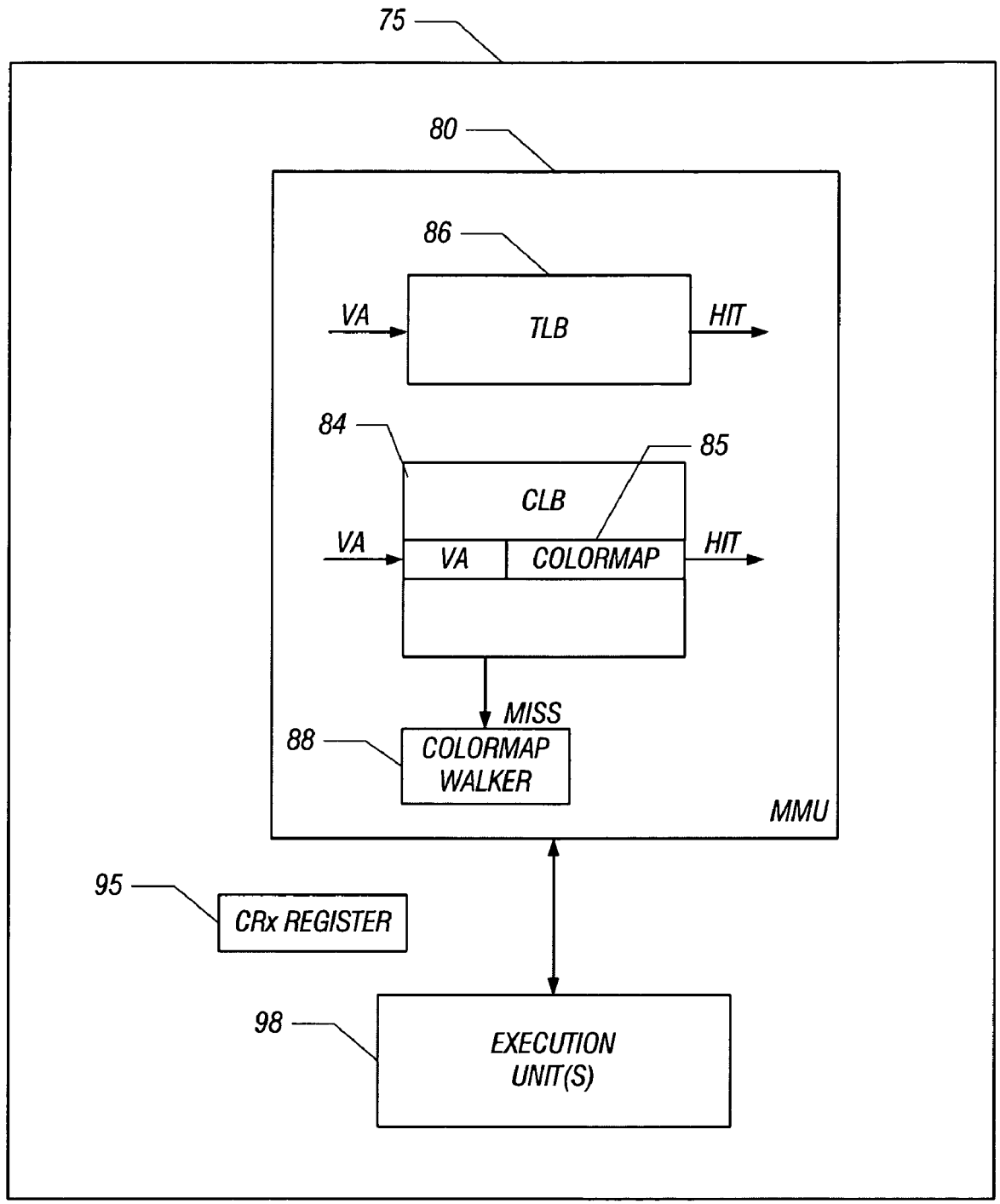
FIG. 4 is a block diagram of a portion of a processor in accordance with one embodiment of the present invention.

Referring now to FIG. 4, shown is a block diagram of a portion of a processor in accordance with one embodiment of the present invention. As shown in FIG. 4, a processor 75 may include a memory management unit (MMU) 80, along with one or more execution units 98 to perform operations on data. MMU 80 may be used to receive and handle memory request operations. Specifically, MMU 80 may include a TLB 86 that receives incoming VAs and in turn generates physical addresses (PAs) which may be used to access memory requested for an operation. In various embodiments, TLB 86 may include a number of entries, each corresponding to recently used translations between VA and PAs.

Referring still to FIG. 4, similar to TLB 86, MMU 80 may further include a CLB 84, which may include recently accessed portions of a colormap. Accordingly, CLB 84 may include a plurality of entries. Shown for example is an entry 85. Entry 85 may be accessed using at least a portion of an incoming virtual address, and may further include a portion of a colormap array corresponding to that portion of the virtual address. For example, in one implementation six high order bits of a VA may be used to access entries within CLB 84, and each entry 85 may include, e.g., 64 bytes of a colormap array.

Thus when an incoming memory request is received that matches the VA portion present in one of entries 85, a hit occurs. CLB 84 may thus read out at least a portion of the colormap portion of entry 85. Such information may be provided to, e.g., an access validator, which may be present within MMU 80 or another location within processor 75. This access validator may compare a given location within the colormap portion to, e.g., the color identifier present in a pointer of the memory request to determine whether access is to be allowed. If the portions match, access may be permitted, otherwise access may be denied and an exception raised.

Note that if a requested address is not present within CLB 84, a miss may result. This miss signal may be provided to a colormap walker 88, which may be a hardware mechanism to perform an operation similar to a page table walker to obtain from memory a corresponding portion of the colormap array and load it into CLB 84. If such storage into CLB 84 may cause an eviction of a current entry within CLB 84, in one embodiment a least recently used (LRU) algorithm may be used to select an entry of CLB 84 for eviction.

As further shown in FIG. 4, a color register 95 may be present, e.g., in a register file of processor 75. Color register 95 may be used to store a base address of a colormap array, which may be used to thus access the colormap array. While shown with this particular implementation in the embodiment of FIG. 4, understand that the block diagram of processor 75 is at a high level, and various additional components may be present in a particular processor.

To minimize software complexity, the CLB may be coherent to memory based mapping tables. This simplifies software as it does not have to worry about managing when to invalidate CLB entries. However, the hardware cost of maintaining coherency in the CLB may be high, as may be mappings that were loaded from in a structure that is snooped with respect to cache coherency actions maintained in the CLB addresses. There may be additional cost based on ensuring that snoop filters do not interfere with maintaining the CLB coherency.

In other embodiments, the CLB need not be coherent to all potential updates to the memory tables in memory. For this second option there are two possible variations, one where software keeps all CLBs in a system consistent with the colormap, similar to how TLBs are kept consistent. The second variation is where CLBs are allowed to become inconsistent. This may cause some false positives and some false negatives in color matching. In the case of a color mismatch in the CLB, an access violation handler could check if the mismatch is a true mismatch or an artifact of an inconsistent CLB and update the CLB in the case of the latter. While some small fraction of cases where a stale CLB entry may cause a color violation to go undetected, this probability may be low enough to be tolerated. Given the probabilistic nature of colormapping, this variation allow one to minimize both the software and hardware complexity and cost at the expense of a small drop in detection probability.

Even if a CLB is not kept coherent to all memory updates, the CLB may be maintained consistent with local updates to memory that affect the colormap, as relevant updates to the colormap are most likely to originate from stores on the same thread that is using the colormap.

In some implementations, a finer grain of pointer and memory coloring may be implemented on a block-by-block basis. This selective coloring may differentiate pointer ranges at, e.g., 8-byte granularity, at incremental additional cost in hardware and instruction overhead. Such fine-grained coloring may be referred to as subcoloring. Encoding for subcoloring may be provided via offset coloring such that the color encoding may be compact (e.g., 1 bit per 8 bytes). Thus a memory range such as a 512 byte block may be encoded using a single vector, e.g., a single 64-bit vector.

Figure 5:
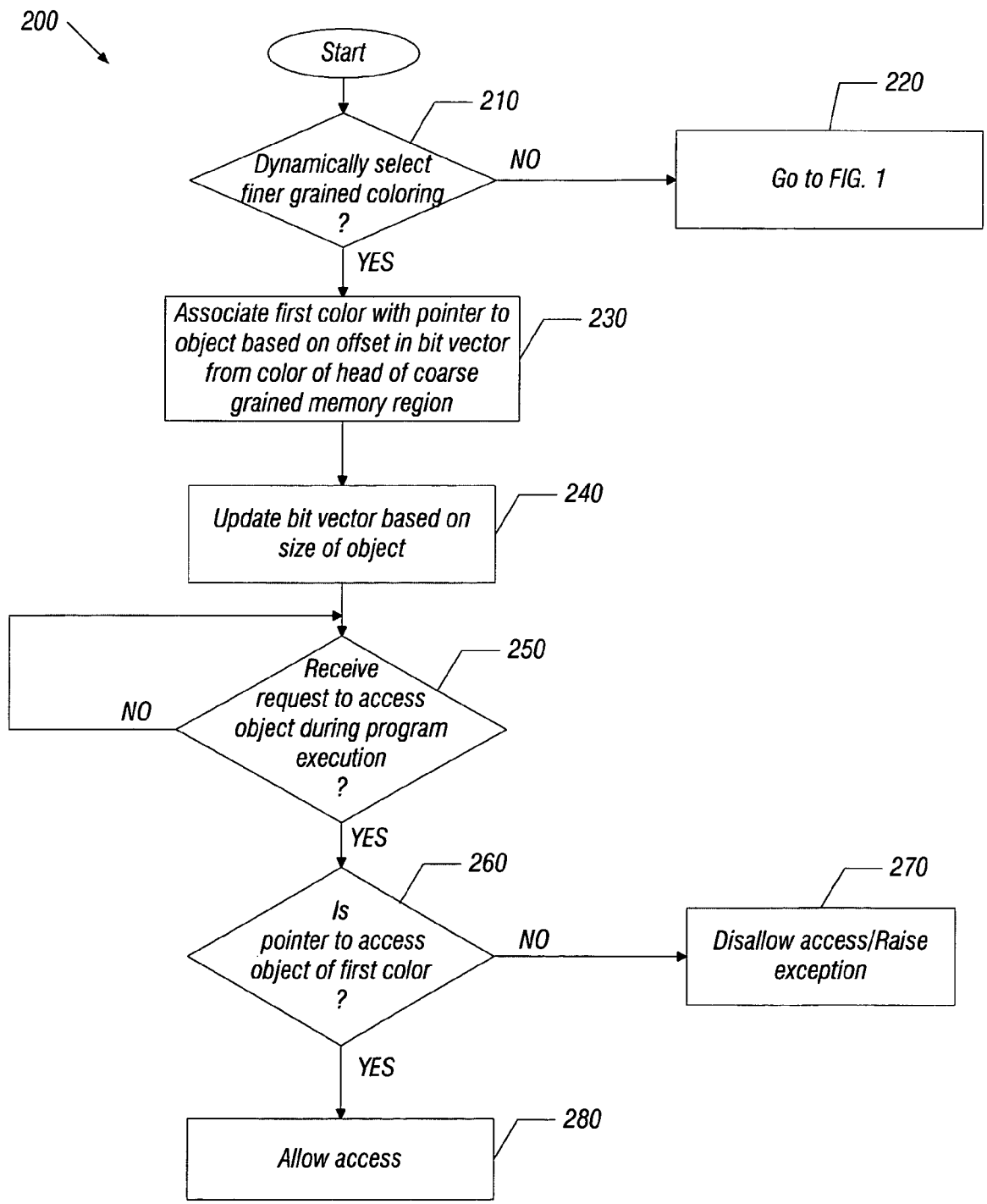
FIG. 5 is a flow diagram of a method for performing finer-grained access control in accordance with an embodiment of the present invention.

Referring now to FIG. 5, shown is a flow diagram of a method for performing finer-grained access control in accordance with an embodiment of the present invention. As shown in FIG. 5, method 200 may begin by determining if a finer grained coloring has been dynamically selected (diamond 210). That is, during operation of different types, different programs, different users or so forth, it may be determined that the coloring mechanism such as described above with regard to FIG. 1 may be desired to be more finely controlled. Such fine control may be implemented on a block-by-block basis, in some embodiments. If it is determined at diamond 210 that such finer-grained control is not desired, control may pass to block 220, for association of a color with a pointer that corresponds to the location in a colormap array for an object to be pointed to by the pointer as described above with regard to FIG. 1, and thus control may pass back to method 10 of FIG. 1.

If instead finer-grained control is desired, control passes from diamond 210 to block 230. At block 230, a color may be associated with a pointer to an object that is based on an offset. More specifically, a bit vector may be associated with the colormap array. Such a bit vector may include a plurality of bit locations, where each bit location corresponds to a fine-grained memory portion. For example, in one embodiment each bit of the bit vector may correspond to an 8-byte sub-section of memory. This bit vector may implement offset or relative encoding. That is, fine-grained control may be realized using a minimal amount of encoding. In one embodiment, such encoding may associate a first bit value (e.g., a logic one value) if the bit location corresponds to an 8-byte sub-segment of memory that includes an object boundary. In contrast, if a corresponding bit location does not point to an object boundary, a second value (e.g., a logic 0) may be stored instead. In this way, fine-grained control may be realized using a minimal amount of encoding.

In various embodiments, the bit vector that is associated with the colormap may begin with the color of the colormap array that corresponds to the location at the head of the coarse-grained memory block. For example, for a 512-byte block of memory, the first bit in the bit vector may correspond to the beginning of this 512-byte block and may be colored the same as the coarse-grained map value. Then, as different objects are stored in the memory block, the first value (e.g., a logic 1) may be stored for each sub-section of the memory block corresponding to an object boundary. Accordingly, an offset or relative mapping is realized such that a color of a given object (e.g., a fourth object within a memory block) may be determined by counting the number of color changes (i.e., four) from the beginning of the block of memory.

Still referring to FIG. 5, next the bit vector may be updated based on the size of an object (block 240). For example, assume that an object to be stored is 40 bytes wide. Continuing with the example in which each bit corresponds to 8 bytes, the object boundary for this 40-byte object may have a value of one stored in the bit vector, while the succeeding four bit locations may store a value of zero to indicate that the corresponding sub-sections of memory including this object are of the same color.

Referring still to FIG. 5, after one or more pointers have been associated with a color, during program execution access to an object in heap memory may be controlled based on the identifiers associated with a pointer to the object. It may be determined whether a request has been received to access an object during program execution (diamond 250). For example, an access validator or other such hardware may receive an access request which may include, e.g., a pointer. If access control in accordance with an embodiment of the present invention is enabled, e.g., via a control bit within a pointer, control may pass to diamond 260 to perform a comparison to determine if the pointer that is seeking to access a given object is of the first color. For example, the number of bits of a logic one value may be counted up and a modulo operation performed to determine the color associated with the pointer. Thus, the access validator may determine whether the color stored in the pointer matches the corresponding color in the colormap array (and/or bit vector location associated with the memory location for the object) that is associated with the location in memory in which the object is stored.

If these colors do not match, control passes to block 270, where the access may be disallowed. Furthermore, in some implementations an exception may be raised which may cause, for example, a user-level handler to perform an exception handling routine. If instead, the pointer color matches the color in the colormap, control passes to block 280 where the access may be allowed.

Figure 6:
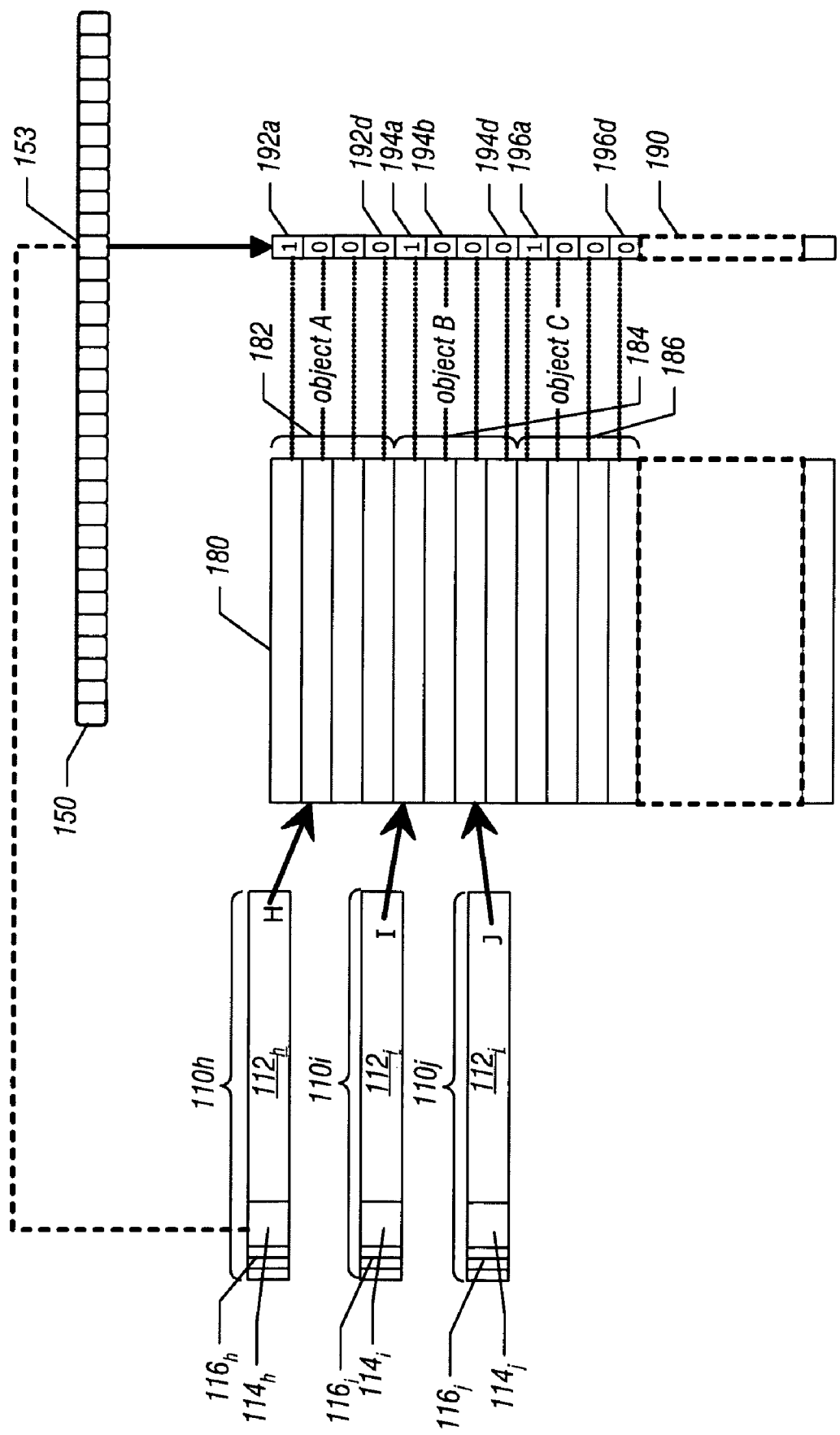
FIG. 6 is a block diagram of an example fine-grained coloring implementation in accordance with one embodiment of the present invention.

Referring now to FIG. 6, shown is a block diagram of an example fine-grained coloring implementation in accordance with one embodiment of the present invention. As shown in FIG. 6, colormap array 150 may be adapted similarly to that of colormap array 150 of FIG. 2. That is, each location, e.g., location 153, may include a color value for a corresponding block of a memory 180, e.g., a 512-byte block. However, to implement finer-grained access control to subsections of memory block 180, a bit vector 190 may be associated with location 153 of colormap array. As shown in FIG. 6, each bit of bit vector 190 may be associated with a corresponding subsection, e.g., 8-byte portion of memory block 180. Thus each 512 byte block range where finer grained coloring is desired may be divided into 64 8-byte block ranges. In the depicted example, without loss of generality, assume three different colors are to be applied for three objects 182 (object A), 184 (object B), and 186 (object C), each of which is 32 bytes in size, and arrayed contiguously starting at the beginning of block 180.

The association between bit vector 190 and colormap array 150 may be provided through an index tree that can be traversed efficiently in microcode, in one embodiment. To provide for efficient coding, in one embodiment a bit at position N in bit vector 190 may be set to a value of logic one if and only if the $N^{th}$ 8-byte subsection of block 180 is the start of a new pointer color. In other words, the color in a valid pointer to the $k^{th}$ object is the color that is k colors from the color of the 512-byte block. The value of k that can be inferred from bit vector 190 by counting the number of logic one values starting from the beginning of the vector. Thus as shown in FIG. 6, bit vector 190 includes logic one values at positions 192a, 194a, and 196a, while logic zeroes are present in the other indicated positions including, e.g., positions 192d, 194b, 194d, and 196d.

As further shown in FIG. 6, a plurality of pointers $110_h$-$110_j$ (generically pointers 110) each point to within one of objects 182, 184, and 186. Each pointer 110 includes a VA portion $112_h$-$112_j$, a respective color encoding portion $114_h$-$114_j$ as well as a corresponding color enable indicator $116_h$-116J. An instruction prefix override indicator $117_h$-$117_j$ may be used to suppress fine-grained color checking for the code that manages the subcolors and paints the pointers handed out to callers of a memory allocator, for instance.

Thus in this example, objects 182, 184, and 186 have their memory areas associated with consecutive colors; accordingly pointers $110_h$ and $110_j$ with valid colors can point into the corresponding objects 182 and 184, while pointer 110$_i$ which has strayed from object 182 and points into object 184 can be treated as an out-of-bounds pointer.

In an implementation that uses a CLB, sub-colors may be supported through the CLB by extending the CLB with a bit that encodes the presence of subcolors within a 512 byte range. A separate associative subcolor lookaside buffer may be used to perform the color check. Alternately, the subcolor check can be performed explicitly by using a small cache of the subcolor bit vectors that encode the new color boundaries.

In various embodiments, while dynamic ranges are checked with pointer coloring at a coarse-grained level, stack-based objects (which may use finer-grained protection) may be protected with the use of an opaque stack that supports the execution of safe functions, while allowing legacy functions to use a normal stack. Note that such an opaque stack may be optional. That is, in some implementations finer-grained coloring described can be applied to stack objects without creating a parallel opaque stack.

In various embodiments, a stack can also be colored at a fine granularity very similar to the sub-coloring approach discussed above for the heap. However, some differences to optimize performance for the stack may be implemented. Coloring the stack may also use software that is intimately aware of the stack coloring support.

In one such embodiment, the memory range of the stack may be colored using the same mechanism as the heap for fine-grained coloring. Every time the stack is grown for a new frame the software may provide a descriptor of the object boundaries in the stack. These boundaries can be described by bit vectors describing where at finer granularity units (e.g., 8 byte) new objects start. Since stack frames may not align to 512-byte block alignments, an interface may be provided for software to identify object boundaries for new stack frames and have the hardware adjust this information according to the stack alignment to update the fine-grain colormap.

One interface may provide an instruction that encodes a size of a stack frame and a pointer to a byte-aligned bit vector in memory. Using this interface, microcode may examine the current stack alignment and starting color and update the colormap accordingly. The coloring of the stack may be based on consecutive colors wrapping around. Register state may store the starting color of the current stack frame. This register may be saved and restored as part of the stack maintenance at function call and return points. In some implementations, pushes to the top of the stack can still be handled as uncolored operations. In other implementations, a register may store the boundary at which pushes for the current stack frame started. This register may also be saved and restored at function boundaries. One check that can be implemented is to check if pops are performed beyond the range where pushes were performed for a stack frame.

Unlike the heap, pointers are not allocated to each object in the stack, instead objects may be referenced as an offset from the stack pointer or the base pointer. For referencing objects in the stack, an instruction that encodes both an address offset in bytes from the base pointer as well as an offset in terms of the number of objects from the starting object of the stack frame can be used. Hardware can then confirm that the current starting color of a stack frame (e.g., encoded in a register as discussed above) with modulo addition of the offset in objects is the same color as indicated in the colormap for the address specified by adding the byte offset to the base pointer. This check may be performed with an instruction for validating stack references, which may be executed prior to a stack reference, e.g., at software's discretion. The base pointer and stack pointer may be kept as clear pointers, enabling unchecked references at software discretion. An instruction may also be provided to generate a colored pointer based on the base pointer, a byte offset and an object offset for the current frame. This allows software to efficiently generate colored pointers for dereferencing stack objects being passed to other functions.

Figure 7:
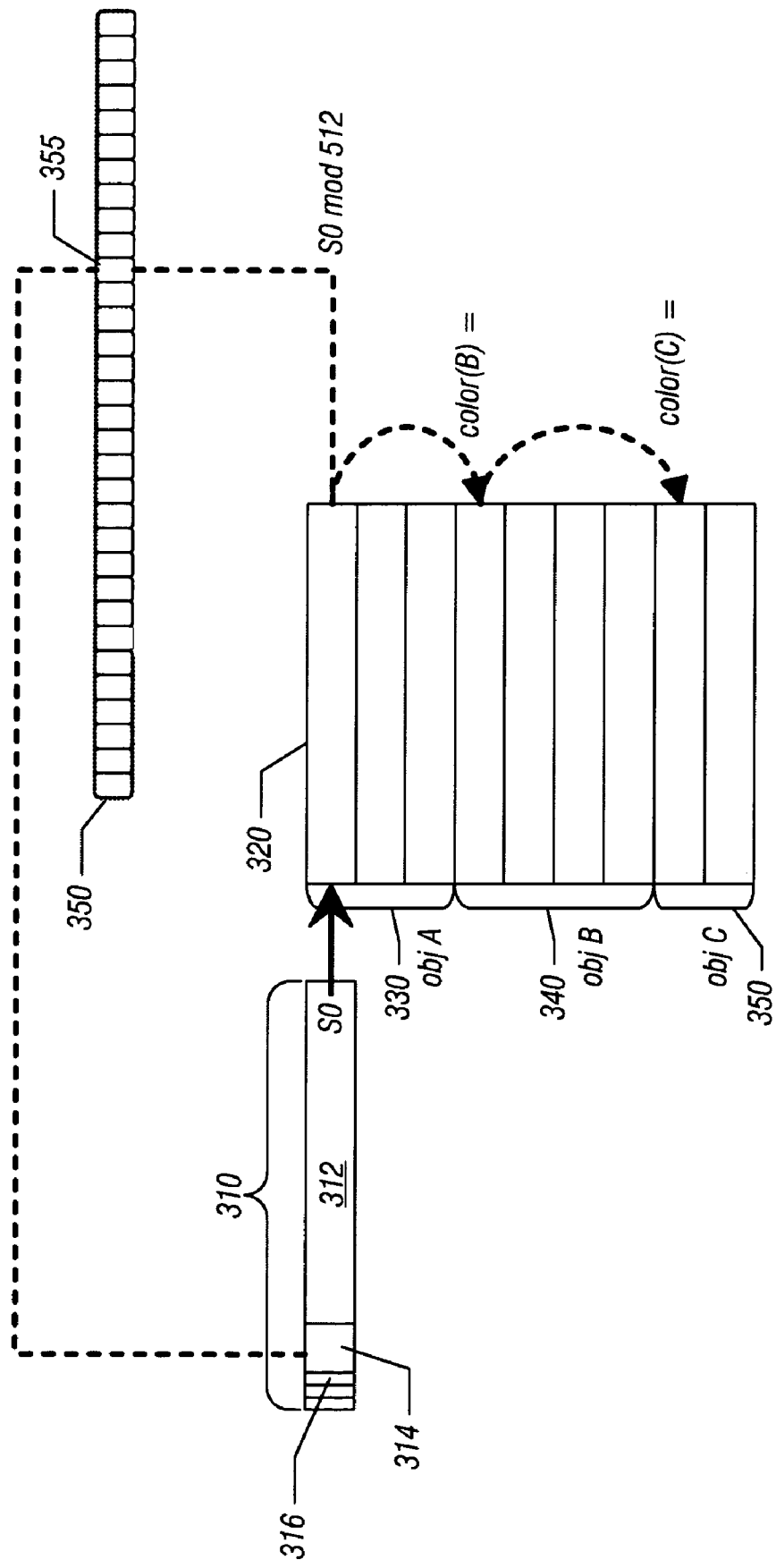
FIG. 7 is a block diagram of an implementation of color mapping for a stack in accordance with an embodiment of the present invention.

Referring now to FIG. 7, shown is a block diagram of an implementation of color mapping for a stack in accordance with an embodiment of the present invention. As shown in FIG. 7, a stack 320 may include different objects 330, 340, and 350, each of which may be associated with a different color. A colormap array 350 may include a location 355 of a color that corresponds to that in a first object 330. As shown in FIG. 7, information from a control register may be stored in a first portion of first object 330. More specifically, a starting color 314 of this stack frame may be stored in first portion 310, which includes a VA portion 312, along with various control bits, e.g., including a demarcation bit 316 which may be present when first portion 310 is pushed onto the stack. This demarcation bit 316 may be used to identify the beginning of a new object that starts at a next, e.g., 8 byte memory stack subsection. In one embodiment, a one value may correspond to identification of a new object at the next 8 byte subsection, while a zero may indicate continuation of the present object. However, the scope of the present invention is not limited in this regard.

In other embodiments statically allocated memory regions may also be protected using access mechanisms in accordance with an embodiment of the present invention. To protect non-dynamic ranges, one approach may be to generalize the fine-grained stack coloring described above to ranges of memory that are statically set up by a compiler and linker. Unlike the stack, such ranges do not require support for stack/frame pointer based dereferences. However, as with fine-grained stack colors, a compiler may be made aware of object boundaries it wishes to encode, and may also ensure that pointer differences (such as &q-&p) which are legal in a language like C or C++ do not generate improper results because q and p have different colors. By identifying pointer arithmetic at compile time, the compiler can mask the color fields of such pointers as are declared as colored before arithmetic is performed.

In some implementations, non-dynamic ranges may be protected with two colors without using colored pointers. As one example, non-dynamic ranges may be protected using only a first and second color. In this way, coloring and its associated protection may be realized without recompilation. In one embodiment, a white (e.g.) range may be configured as a valid range, while a black (e.g.) range is configured as an invalid range, such as shown above in FIG. 3. That is, pointers themselves are not colored, but if a pointer points into a black range it may be identified as a stray pointer. In this way, black ranges may function as guard bands, which may be placed liberally between static objects. The encoding of black ranges can be done by using offset coloring, and the infrastructure for subcoloring of dynamic ranges can be applied in a very direct way to protect memory ranges that are not dynamic from inter-object pointer skids.

Thus embodiments may provide support for protection of memory accesses in a lightweight manner. That is, both minimal hardware and compiler mechanisms to generate and update coloring may be realized. This path to code and data safety may be realized while treating color-enabled code and legacy code similarly, and thus there may be no need for a mixed-mode of execution. Accordingly, instead of associating each pointer with a capability or a bounds descriptor leading to proliferation of such structures in caches and memory, the pointer coloring scheme described herein subsumes the bounds description within the pointer itself and thus provides a statistical level of safety. At the same time, because the stack is protected more strictly, embodiments may rebuff exploits that are based on generating stack overruns.

Figure 8:
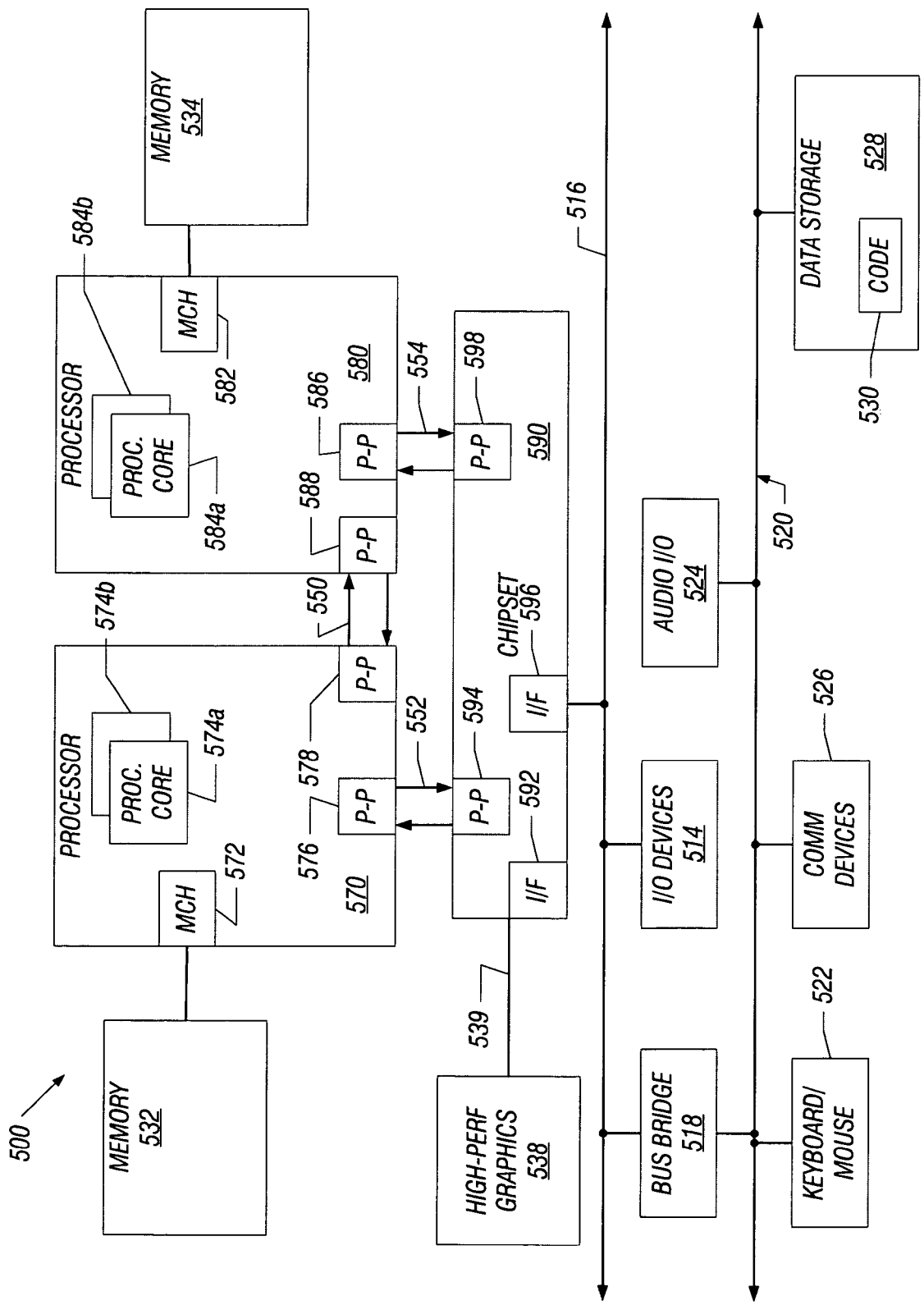
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574a and 574b and processor cores 584a and 584b). Note that pointers generated by each of the cores may include color identifiers in accordance with an embodiment of the present invention, and such cores may include a CLB associated with a corresponding colormap array.

First processor 570 further includes point-to-point (P-P) interfaces 576 and 578. Similarly, second processor 580 includes P-P interfaces 586 and 588. As shown in FIG. 8, memory controller hubs (MCH's) 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 8, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 8, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 8, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising: a computer-readable medium including instructions that enable the apparatus to organize a map including a plurality of elements each to store a value for a corresponding block of a memory, wherein the value is a random value to be arbitrarily generated and is to be used to determine access permission to the corresponding block of the memory, wherein access to a kth portion of the memory block is to be controlled by comparison of a value of the element of a location of the map that is k locations from the location of the map for the memory block, and wherein the instructions enable accessing a vector associated with at least one of the elements of the map, wherein the vector includes a plurality of portions each having a first value to identify that a corresponding portion of the corresponding block of the memory includes an object boundary, and having a second value to identify that the corresponding portion does not include an object boundary.

2. The apparatus of claim 1, further comprising a storage to store at least a portion of the map, wherein the portion is to accelerate determination of the access permission.

3. The apparatus of claim 2, wherein the storage comprises a color lookaside buffer (CLB).

4. The apparatus of claim 3, wherein the CLB is to store a plurality of entries, each of the entries to include a portion of the map for a region of the memory including a plurality of blocks.

5. The apparatus of claim 3, further comprising a translation lookaside buffer (TLB) to store virtual address to physical address translations.

6. The apparatus of claim 5, wherein the CLB is to be maintained incoherently with the TLB.

7. The apparatus of claim 1, wherein the map is to store a first selected value in an element if access to the corresponding block of the memory is to be unlimited such that a pointer having an encoding portion with any value can access the memory block, and to store a second selected value in the element if no access to the corresponding block of the memory is to be permitted such that no pointer can access the memory block.

8. The apparatus of claim 1, further comprising an access validator to determine if an identifier portion of a pointer matches the value stored in an element of the map, wherein the pointer points to a block of the memory corresponding to the element of the map.

9. The apparatus of claim 8, wherein the access validator is to prevent access to the corresponding block of the memory if a mismatch occurs.

10. A machine-readable medium having stored thereon instructions, which if executed by a machine cause the machine to perform a method comprising: determining if a first portion of a pointer matches a value stored in a location of a map that corresponds to a block of memory pointed to by the pointer when executing a first program on the machine, the value corresponding to a random value arbitrarily generated to provide statistical protection against type-unsafe pointer accesses; and allowing access to the block of memory if a match occurs, otherwise preventing the access, wherein access to a kth portion of the memory block is to be controlled by comparison of a value of a location of the map that is k locations from the location of the map for the memory block; and accessing a vector associated with at least one of the locations of the map, wherein the vector includes a plurality of portions each having a first value to identify that a corresponding portion of the corresponding block of the memory includes an object boundary, and having a second value to identify that the corresponding portion does not include an object boundary.

11. The machine-readable medium of claim 10, wherein the method further comprises:
    searching a color lookaside buffer (CLB) for a portion of the map associated with the pointer; and
    obtaining and storing the portion of the map in the CLB if the portion of the map is not present in the CLB.

12. The machine-readable medium of claim 10, wherein the method further comprises encoding the value in an instruction that is to access the block of memory.

13. The machine-readable medium of claim 10, wherein the method further comprises dynamically modifying a size of the location of the map and the corresponding block of memory.

14. A system comprising:
    a map having a plurality of locations each to store an identifier to control access to a corresponding block of a memory, wherein access to a $k^{th}$ portion of the memory block is to be controlled by comparison of a value of the identifier of a location of the map that is k locations from the location of the map for the memory block;
    a vector associated with at least one of the locations of the map, wherein the vector includes a plurality of portions each having a first value to identify that a corresponding portion of the corresponding block of the memory includes an object boundary, and having a second value to identify that the corresponding portion does not include an object boundary; and
    a dynamic random access memory (DRAM) coupled to the map, the DRAM comprising the memory.

15. The system of claim 14, further comprising a color lookaside buffer (CLB) to store a plurality of entries, each of the entries to include a portion of the map for a region of the memory including a plurality of blocks.

16. The system of claim 15, further comprising a walker coupled to the CLB to obtain a portion of the map and store the portion in the CLB if at least a portion of a pointer does not hit in the CLB.

17. The system of claim 14, further comprising a control register to store a base address for the map.

18. The apparatus of claim 1, wherein the random value is to be reused according to random scheme to determine access permission to a different block of the memory.

19. The machine-readable medium of claim 10, wherein the method further comprises not determining if the first portion of the pointer matches the value and instead directly allowing the access to the memory block when executing a second program on the machine, the second program corresponding to a legacy program unaware of the statistical protection.

20. The system of claim 14, wherein k is determined based on a number of the portions of the vector having a first value.

21. The system of claim 14, wherein k is determined based on a modulo operation between an address portion of a pointer to the corresponding portion of the memory block and a size of the memory block.

22. A processor comprising: an execution unit to execute instructions; and a memory management unit (MMU) coupled to the execution unit, the MMU including: a translation lookaside buffer (TLB) to store virtual address to physical address translations; and a color lookaside buffer (CLB) including a plurality of entries, each of the entries to include a portion of a map for a region of a memory coupled to the processor, the region including a plurality of blocks, the map including a plurality of elements each to store a value for a corresponding block of the memory, wherein the value is a random value to be arbitrarily generated and used to determine access permission to provide statistical protection against type-unsafe pointer accesses by a pointer to the corresponding block of the memory; and a vector associated with at least one of the elements of the map, wherein the vector includes a plurality of portions each having a first value to identify that a corresponding portion of the corresponding block of the memory includes an object boundary, and having a second value to identify that the corresponding portion does not include an object boundary; wherein the processor is to determine if a first portion of the pointer matches a value stored in an entry of the CLB during execution of a first program, and allow access to the block of memory if a match occurs, otherwise to prevent the access, wherein access to a kth portion of the memory block is to be controlled by comparison of a value of the element of a location of the map that is k locations from the location of the map for the memory block.

23. The processor of claim 22, wherein the processor is to search the CLB for a portion of the map associated with the pointer, and obtain and store the portion of the map in the CLB if the portion of the map is not present in the CLB.

24. The processor of claim 22, wherein the CLB is to be maintained incoherently with the TLB.

* * * * *